July 24, 1962  J. E. STEINER  3,046,411
CONDITION SENSING APPARATUS
Filed Dec. 30, 1958
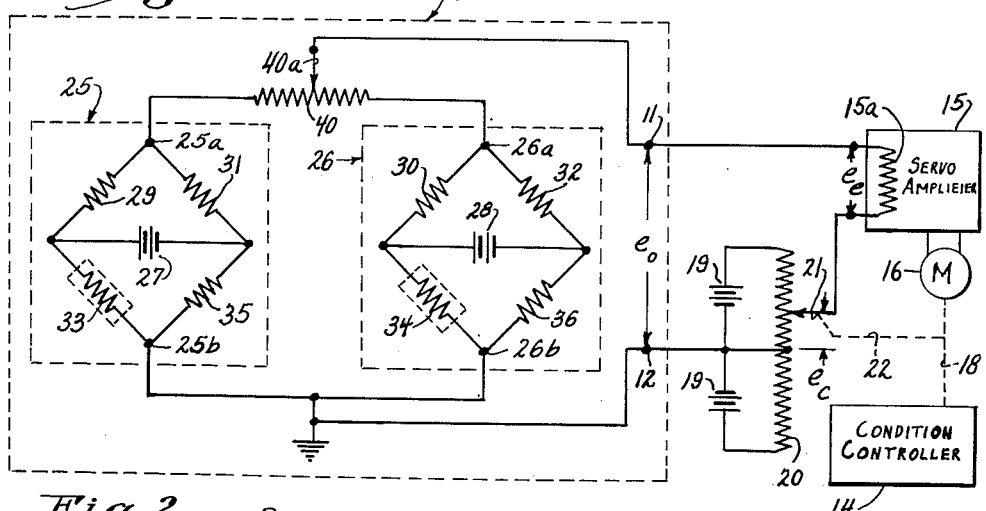
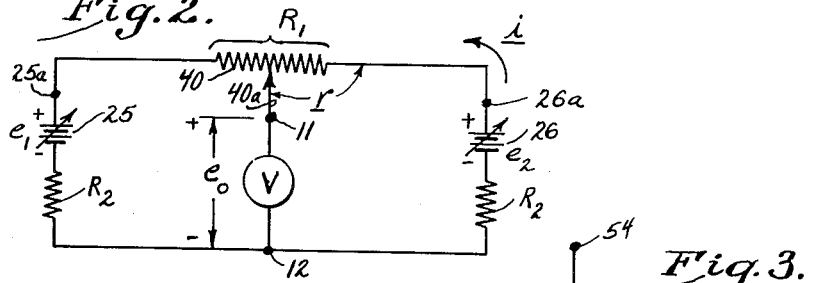
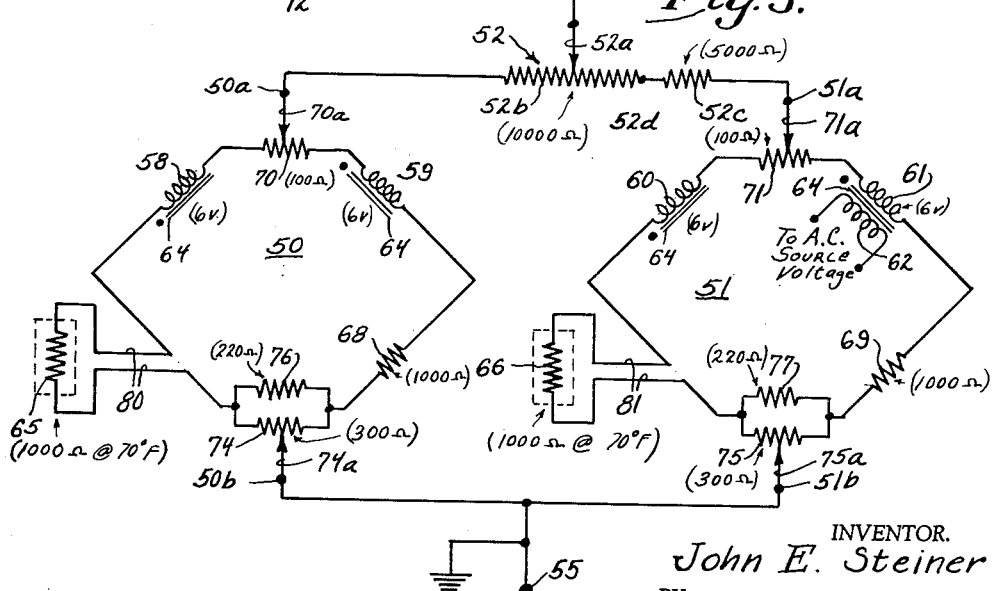
INVENTOR.
John E. Steiner
BY
Carlson, Pitzner, Hubbard & Wolfe
ATTORNEYS United States Patent Office 3,046,411
Patented July 24, 1962

3,046,411
CONDITION SENSING APPARATUS
John E. Steiner, Rockford, Ill., assignor to Barber-Colman Company, Rockford, Ill., a corporation of Illinois
Filed Dec. 30, 1958, Ser. No. 783,959
3 Claims. (Cl. 307—43)

This invention relates in general to condition sensing apparatus, and more particularly to the creation of a signal which varies as a function of a plurality of changeable conditions. Although not so limited, the invention finds advantageous applications in automatic servo systems for controlling temperatures, pressures, positions, or other such conditions to keep them constant or to vary them according to a desired program. Similarly, the invention will find use in apparatus where alarms or warnings need be sounded whenever the values of plural conditions reach a dangerous combination.

It is one of the more important objects of the invention to provide a very simple arrangement for creating a signal which varies as a function of two or more changing conditions, yet in which the relative weight or "authority" of each condition in contributing to the signal magnitude may be readily adjusted.

Another object is to realize such a plural condition-responsive signal producing means in which all electrical components may reside at a relative low impedance level above ground potential. This greatly reduces the pick-up by stray inductive or capacitive coupling of spurious noise signals, especially when a condition-sensing element is located at a distance from, and connected by long wires to, the circuits and amplifiers with which it works.

A further object is to make possible changing of the weight or "authority" with which two conditions effect a composite signal through the use of a relatively inexpensive potentiometer or the like, in combination with two single condition-responsive signal generators.

Other objects and advantages will become apparent as the following description proceeds, taken in conjunction with the accompanying drawings, in which:

FIGURE 1 is a schematic illustration of condition-sensing apparatus embodying the present invention, and shown for background purposes as employed in a condition-controlling system;

FIG. 2 is an equivalent circuit of the condition-sensing apparatus shown in FIG. 1 and represents a simplified embodiment of the invention which facilitates an understanding of its organization and operation; and FIG. 3 is a schematic diagram of a third embodiment of the invention.

While the invention has been shown and will be described in some detail with reference to particular embodiments thereof, there is no intention that it thus be limited to such detail. On the contrary, it is intended here to cover all alternatives, modifications and equivalents falling within the spirit and scope of the invention as defined by the appended claims.

Referring now to FIG. 1, the exemplary condition-controlling system there shown includes a plural condition-sensing apparatus, indicated generally at 10, and producing between output terminals 11 and 12 an output signal in the form of a voltage $e_0$ which varies in polarity and magnitude as a function of the values of two changeable conditions. This output voltage is algebraically combined with a feedback voltage $e_c$ which represents the setting of a condition controller 14. The algebraic combination of the condition-representing voltage $e_0$ and the controller-setting voltage $e_c$ is obtained by connecting these two voltages in series-bucking relation across the input impedance 15a of a servo amplifier 15, thereby producing an error signal $e_e$ as the input to the servo amplifier.

Depending upon the magnitude and polarity of the error signal $e_e$, the amplifier 15 energizes a motor 16 to rotate at a corresponding speed and in a corresponding direction. The motor is drivingly connected at 18 to positon a movable control member, such as a valve or rheostat (not shown) in the condition controller, so that the latter is set to the proper position.

The voltage $e_c$ which represents the setting of the controller 14 is created by a center tapped voltage source or battery 19 connected across a potentiometer resistor 20 having a movable wiper 21. This wiper is drivingly connected at 22 to be shifted when the motor 16 is energized to reset the control member in the controller 14.

When the condition being controlled for any reason changes, the output voltage $e_0$ of the sensing apparatus will correspondingly change. This will create some value for the error signal $e_e$, so that the motor 16 is energized to reset the condition controller 14. The motor 16 will also reposition the potentiometer wiper 21, thereby changing the value of the controller-setting voltage $e_c$ until the error signal $e_e$ is reduced to zero and the motor is deenergized.

Simply by way of example, the system of FIG. 1 may be considered as a system for controlling the temperature within a house and in which the output voltage $e_0$ varies as a function of the temperatures at two or more remote locations, say, inside and outside of the house. As the error voltage $e_e$ increases positively or negatively from a zero value, indicating that the temperatures inside and outside the house do not have the desired combination of values, then the motor 16 will be energized to reset the condition controller 14. The latter may be, for example, a valve controlling the rate of admission of fuel to an oil furnace, or a rheostat controlling the current supplied to heating resistors.

In such temperature-controlling systems, and in others for controlling different conditions, it is desirable to make the controlled inside temperature more constant and less subject to variations by sensing a plurality of conditions of different types or at different locations. For example in temperature control systems for homes and offices, enhanced operations can be obtained by employing means to sense the temperature within the building and to sense the temperature outside of the building. If these two temperatures jointly contribute to the magnitude of the output voltage $e_0$, then marked increases or decreases in the outside temperatures may cause a corrective effect on the condition controller 14 before the temperature within the building itself has time to change appreciably. Moreover, in some instances it may be desirable to sense both the temperature and the humidity within the building and to govern the furnace or heat producing means in accordance with the combination of these two conditions, so that the occupants have the feeling that the temperature is remaining constant even though the temperature and humidity are both undergoing changes.

In accordance with the present invention, the plural condition-sensing apparatus 10 not only produces an output signal $e_0$ which varies as a function of two or more sensed conditions such as temperatures at different locations, or temperature and humidity at a given location, but also permits quick and convenient adjustment in the relative weight or "authority" with which the two conditions influence the final output signal. As here shown, the sensing apparatus comprises two sources of signals which vary, preferably in a substantially proportional fashion, with changes in the values of two individual conditions. These two condition-representing signal sources are here illustrated as first and second bridge circuits 25, 26 energized by appropriate voltage sources or batteries 27, 28.

These bridge circuits have two arms in which are connected substantially equal-valued impedances or resistors 29, 30 and 31, 32, these arms being connected in series across the respective voltage sources. Similarly, each bridge circuit includes substantially equal-valued impedances or resistances 33, 34 and 35, 36 connected across the voltage sources 27, 28. The junctions between the series-connected arms form output terminals 25a, 25b and 26a, 26b.

The two resistances 33 and 34 shown in FIG. 1 are condition-sensitive elements and, in this instance, are resistors having a relatively high temperature coefficient of resistance. Thus, as the temperature to which the resistors 33 and 34 are exposed increases or decreases, their resistance values will increase or decrease, thereby unbalancing the bridge circuits in one direction or the other and producing output voltages between the terminals 25a, 25b and 26a, 26b which vary in magnitude and polarity according to the extent of temperature deviation from a control point and the sense of such deviation.

In a typical installation, the first temperature-sensing resistor 33 may be located inside of a house, and the second temperature-sensing resistor 34 located outside of the house. The voltages which appear across the terminals 25a, 25b and 26a, 26b of the two individual bridges 25, 26, thus will vary substantially proportionally with changes in the inside temperature and the outside temperature.

In order to make the composite output signal $e_0$ vary as a function of the two conditions or temperatures which are sensed, and to permit variation in the authority with which the individual conditions affect the magnitude of the output voltage $e_0$, the two individual condition-responsive signal sources or bridges 25, 26 are connected in series relation across a potentiometer 40, here shown as a resistance having a wiper 40a movable therealong. The output terminals 11 and 12 are formed by the wiper 40a and the common junction between the two bridge circuits, i.e., the junction between the output terminals 25b and 26b. As the potentiometer wiper 40a is shifted to the left or right as viewed in FIG. 1, then the effect or authority of the condition or temperature sensed by the resistor 33 will be increased or decreased relative to the effect or authority of the condition sensed by the resistor 34. Thus, the entire condition controlling system may be made to respond with more sensitivity to the inside temperature sensed by the resistor 33 than to the outside temperature sensed by the resistor 34, and the proportioning or relative authorities of these two temperatures in governing the control system may be conveniently varied in order to obtain just the desired composite control.

The essential requisites and operation of the condition-sensing apparatus shown in FIG. 1 may be better understood with reference to the simplified, equivalent illustration in FIG. 2. The two condition-responsive signal sources 25, 26 are there represented as variable batteries which produce voltages $e_1$ and $e_2$ agreeable in polarity and proportional in magnitude to deviations of the respective sensed conditions from selected reference values. Since the bridge circuits shown in FIG. 1 always have some resistance between their output terminals, this has been indicated in FIG. 2 by constant-valued resistors $R_2$. Although the total resistance of each bridge circuit in FIG. 1 will vary as the temperature sensitive resistors 33 and 34 undergo resistance changes, the total resistance variation between the output terminals of the bridge circuits is so slight that it can be, for purposes of explanation, neglected.

The potentiometer 40 is shown in FIG. 2 as connected between the output terminals 25a and 26a of the two condition-responsive signal sources 25 and 26, and the wiper 40a has been shown as forming the output terminal 11. A voltmeter V is illustrated as connected between the output terminal 11, and the output terminal 12 which is formed by the common junction between the two sources 25 and 26. The composite output signal $e_0$ will appear between the output terminals 11, 12, and will be indicated by the voltmeter V, which is assumed to have a very high or practically infinite resistance.

It will be understood that the voltages $e_1$ and $e_2$ produced by the sources 25 and 26 may vary both in magnitude and polarity depending upon the value of the respective conditions which are sensed. It is assumed, merely for the sake of analysis, that these voltages will be considered "positive" when they have the polarity indicated. Some current may flow around the series loop illustrated in FIG. 2, and this current $i$ is assumed to be positive when it flows in the direction shown by the associated arrow. Moreover, for any setting of the potentiometer wiper 40a, a certain proportion of the total resistance $R_1$ of the potentiometer 40 will be connected between the terminals 26a and 11. The value of this resistance, which may be changed by adjusting the wiper 40a, is represented by the symbol $r$.

With the foregoing in mind, the sum of the voltages around the series loop may be equated to zero:

$$e_2 - iR_1 - e_1 - iR_2 - iR_2 = 0 \qquad (1)$$

From (1), the current flow may be expressed:

$$i = \frac{e_2 - e_1}{R_1 + 2R_2} \qquad (2)$$

Taking the voltage drops around the right loop which includes the voltmeter V with the output voltage $e_0$ thereacross, it will be seen that $$e_2 - ir - e_0 - iR_2 = 0 \qquad (3)$$

Equation 3 may be rewritten:

$$e_0 = e_2 - i(r + R_2) \qquad (4)$$

Substituting the current $i$ from Equation 2 into Equation 4, the output voltage $e_0$ may be expressed:

$$e_0 + e_2 - \frac{(e_2 - e_1)(r + R_2)}{(R_1 + 2R_2)} \qquad (5)$$

Equation 5 may be expanded to the form $$e_0 = e_2\left(1 - \frac{r}{R_1 + 2R_2} - \frac{R_2}{R_1 + 2R_2}\right) + e_1\left(\frac{r}{R_1 + 2R_2} + \frac{R_2}{R_1 + 2R_2}\right) \qquad (6)$$

Since the resistance values represented by the capital R's in Equation 6 are constant, the quantity $R_1 + 2R_2$ can be replaced by a composite constant A, and the quantity $$\frac{R_2}{R_1 + 2R_2}$$

replaced by a composite constant B. With this, Equation 6 may be rewritten:

$$e_0 = e_2\left(1 - B - \frac{r}{A}\right) + e_1\left(B + \frac{r}{A}\right) \qquad (7)$$

It will be observed that the first term in Equation 7 represents that component of the output voltage $e_0$ contributed by the condition-responsive signal source 26, while the second term represents that component contributed by the first signal source 25. As the potentiometer wiper 40a (FIG. 2) is adjusted to the left or the right, the value of the resistance $r$ will be increased or decreased. Thus, for any values which the two conditions and the two corresponding voltages $e_1$ and $e_2$ may have, the relative magnitudes of the first and second terms in Equation 7 will be decreased and increased, respectively, as the wiper 40a is moved to the left. It will become apparent that the weight or "authority" with which the two conditions affect the net control signal may be readily adjusted simply by setting the wiper 40a to different positions.

Consider for example that the first signal-responsive source 25 senses and changes with the inside temperature of a building, while the second source 26 senses and changes with variations in the temperature outside of the building. If it is desired to have the control system, such as that shown in FIG. 1, respond with more sensitivity to the inside temperature than to the outside temperature in setting the controller 14, then the potentiometer wiper 40a will be adjusted to a position considerably toward the left end of the potentiometer 40. On the other hand, if it is desired to make variations in outside temperature have a more predominant influence on the control system and the setting of the controller 14 within the building, then the wiper 40a will be adjusted to a position more nearly toward the right end of the potentiometer 40. The present system is one in which the relative influence or "authority" of the two temperature-sensing sources may be varied over a wide ratio. In one commercial arrangement, this variation in ratio of authority of the inside to the outside temperature may be set at any value between 20:1 and 0.5:1.

FIG. 3 illustrates still another and preferred form of dual-condition sensing apparatus constructed in accordance with the present invention. As there shown, two condition-responsive alternating current bridge circuits 50 and 51 are provided, these having individual output terminals 50a, 50b and 51a, 51b, respectively. The two bridge circuits are connected, as previously described, in series with one another across a potentiometer 52 having an adjustable wiper 52a, by connecting the output terminals 50a and 51a to the opposite ends of the potentiometer, and by connecting the output terminals 50b and 51b together. The potentiometer wiper 52a and the common junction of terminals 50b, 51b form main output terminals 54 and 55.

In this form of the invention the two uppermost branches of the bridge circuits are created by transformer secondary windings 58, 59 and 60, 61. All of these secondary windings are substantially identical and associated with a common transformer core 64 on which is disposed a single primary winding 62 energized from a suitable alternating voltage source. The lower arms of these two bridge circuits include as condition-sensing elements temperature-sensitive resistors 65 and 66, and balancing resistors 68 and 69.

The output terminals 50a and 51a are connected to the junctions of their associated secondary windings 58, 59 and 60, 61 through potentiometers 70, 71 having adjustable wipers 70a and 71a. Adjustment of these wipers permits each bridge circuit to be individually calibrated and corrected for any dissimilarities between the matched components in the respective pairs of arms.

The output terminals 50b and 51b are formed by wipers 74a and 75a adjustable along potentiometers 74 and 75 connected between the adjacent extremities of the paired resistors 65, 68 and 66,, 69. These latter potentiometers are paralleled by resistors 76 and 77 respectively, so as to reduce the over-all range of resistance variation. Adjustment of the potentiometer wipers 74a and 75a serves to vary the control point for each of the bridge circuits 50 and 51, that is, the temperature at which the respective bridges become balanced and the individual output signals on their terminals reduced to zero.

The operation of the alternating current bridge circuits 50 and 51 in FIG. 3 is quite similar to that previously described in connection with circuits 25 and 26 in FIG. 1. As the resistance-varying sensing elements 65 and 66 change in value from a control point determined by the setting of the wipers 74a and 75a, then the A.C. voltages appearing across the output terminals 50a, 50b and 51a, 51b will change in magnitude, and have one phase or the other relative to the source voltage applied to the primary winding 62. The composite alternating output voltage or signal appearing between the terminals 54, 55 will be weighted or influenced to different degrees by the conditions or temperatures sensed by the elements 65 and 66 depending upon the setting of the potentiometer wiper 52a.

As here shown, the potentiometer 52 includes a main resistor 52b, along which the wiper 52a is adjustable, and a second fixed resistor 52c. Since the wiper 52a can only be moved to a limit position represented by the point 52d, the impedance between the terminal 51a and the wiper 52a cannot be reduced below the predetermined value of the resistor 52c. The "authority" of the sensing resistor 66 if it is located outside of a building is ordinarily less than that of the inside sensing resistor 65 and the maximum authority of the resistor 66 is desirably limited. In the arrangement here shown, the maximum sensitivity of the associated control system to the condition sensed by the element 66 is limited. With the various components having the values labeled in FIG. 3, it has been found that the ratio of authority of the condition sensed by the element 65 to that sensed by the element 66 may be varied between 20:1 (with the wiper 52a moved to its limit position) and 0.5:1 (with the wiper 52a moved to its right limit position).

The two condition-sensing element or resistors 65 and 66 have been shown in FIG. 3 as physically displaced from their associated bridges 50, 51 and as being connected to those bridges by relatively long conductors 80 and 81. For example, if the resistance element 65 is located in a front room of a residential dwelling and the sensing element 66 located outside of that dwelling, while the remaining components for the bridge circuits 50 and 51 are located in the basement of the building, then the conductors 80 and 81 will necessarily be relatively long. It is possible that these conductors might pass in proximity to other electrical devices or wiring within the building and thus be subject to having noise voltages induced therein by inductive or capacitive coupling. Such noise voltages would, of course, be transferred to the output terminals 54, 55 and may have an adverse effect upon the operation of an associated control system. However, it is known that the strength of noise signals which might be induced in the conductors is much greater when those conductors are at a relatively high impedance level from ground. The more closely these conductors may be made to ground potential, the lower will be the strength of any stray noise voltages.

The present plural condition-sensing apparatus has as one of its important advantages that fact that both of the components of the bridge circuits 50 and 51, as well as the conductors 80, 81 reside at a relatively low impedance level from ground potential, to which the output terminal 55 is connected. Thus, the possibility of seriously adverse noise signals being picked up and passed through the condition-sensing apparatus is greatly reduced. Moreover, any long conductors leading from the output terminals 54, 55 to an amplifier or the like will lie at a relatively low impedance level from ground. The likelihood of noise pick-up in such conductors is also very small. This feature, together with the convenience of being able easily to change the relative authority of two variable conditions in the over-all control of an automatic system, makes the present plural condition-sensing apparatus an advantageous yet low cost part of any control system.

I claim as my invention:

1. In apparatus for producing a composite signal which varies as a function adjustable in relative authority of two independently changeable conditions, the combination comprising first and second sources of signals which, respectively, change substantially in proportion to changes in the values of said two conditions, a potentiometer having an adjustable wiper movable therealong, means connecting said first source, said second source and said potentiometer in a series circuit, said series circuit including a common junction between said first and second sources, and two output terminals connected respectively to said wiper and said junction, whereby a composite output signal appearing between said two output terminals varies according to the combined effect of the signals produced by said first and second sources, and the relative authority of such first and second sources in contributing to said composite signal changes according to the adjusted position of said wiper along said potentiometer.

2. In apparatus for producing a composite signal which varies as a function adjustable in relative authority of two independently changeable conditions, the combination comprising first and second similar bridge circuits having means for supplying input voltages thereto, said bridge circuits each having two output terminals, said bridge circuits respectively including elements which vary in impedance with changes in the value of said two respective conditions so that the respective voltages on their output terminals vary substantially proportionally with changes in said respective conditions, a potentiometer having an adjustable wiper movable to different positions therealong, means connecting the output terminals of said first bridge circuit, the output terminals of said second bridge circuit, and said potentiometer in a series circuit, said series circuit including a common junction between one output terminal of said first bridge circuit and one output terminal of said second bridge circuit, and two main output terminals connected respectively to said junction and said wiper, whereby the voltage across said main output terminals will vary according to a function of the values of the two conditions and in which the relative effect of the respective conditions on such voltage may be changed by adjusting said wiper.

3. The combination set forth in claim 2, further characterized by means for preventing the impedance between said potentiometer wiper and one of said bridge circuits from being reduced below a predetermined value.

References Cited in the file of this patent

UNITED STATES PATENTS

| | | |
|---|---|---|
| 2,604,267 | Smith | July 22, 1952 |
| 2,675,701 | Bidwell | Apr. 20, 1954 |
| 2,689,932 | Hornfeck | Sept. 21, 1954 |
| 2,715,332 | McKinley et al. | Aug. 16, 1955 |

FOREIGN PATENTS

| | | |
|---|---|---|
| 896,841 | Germany | Apr. 5, 1956 |